(12) United States Patent
Drebinger

(10) Patent No.: US 8,635,597 B2
(45) Date of Patent: Jan. 21, 2014

(54) METHOD FOR DETERMINING THE PROCESSING ORDER OF MODULES IN A FUNCTION PLAN AND ELECTRONIC DATA PROCESSING SYSTEM FOR CARRYING OUT THE METHOD

(75) Inventor: Andreas Drebinger, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 1117 days.

(21) Appl. No.: 11/922,841

(22) PCT Filed: Jun. 29, 2006

(86) PCT No.: PCT/EP2006/063681
§ 371 (c)(1),
(2), (4) Date: Feb. 6, 2009

(87) PCT Pub. No.: WO2007/003573
PCT Pub. Date: Jan. 11, 2007

(65) Prior Publication Data
US 2009/0216343 A1    Aug. 27, 2009

(30) Foreign Application Priority Data

Jul. 1, 2005   (DE) .......................... 10 2005 031 246

(51) Int. Cl.
*G05B 11/01*   (2006.01)
(52) U.S. Cl.
USPC ................. 717/120; 700/19; 700/20; 700/23; 706/47; 706/48
(58) Field of Classification Search
USPC .................. 717/100, 120; 700/19, 20, 23; 706/47–48; 718/100
See application file for complete search history.

(56) References Cited

U.S. PATENT DOCUMENTS

| 4,451,702 | A  | * | 5/1984  | Brightman et al. | ........... 379/193 |
| 6,233,703 | B1 |   | 5/2001  | Powers           |                     |
| 7,437,740 | B1 | * | 10/2008 | Koerber et al.   | ............... 719/330 |
| 2004/0268335 | A1 | * | 12/2004 | Martin et al.  | ................. 717/161 |
| 2005/0213577 | A1 | * | 9/2005  | Shobatake      | ................. 370/395.1 |
| 2005/0223381 | A1 | * | 10/2005 | Damien et al.  | ................ 718/102 |

FOREIGN PATENT DOCUMENTS

| DE | 4230178 A1      | 3/1994  |
| DE | 10108962 A1     | 9/2002  |
| EP | 0284605 B1      | 10/1990 |
| WO | WO 9934302 A1   | 7/1999  |
| WO | WO 2004072744 A2 | 8/2004 |

* cited by examiner

*Primary Examiner* — Chat Do
*Assistant Examiner* — Lynda Dinh

(57) ABSTRACT

There is described a method for determining the processing sequence of components of a function plan for a sequentially operating automation system. Each component is allocated a component code in a reversible unambiguous manner and, while the components have a signal input and output connection, these should be applicable to a number of various function plans and thus minimize the reaction time of an automation system to process signals. The above is achieved, whereby the signal path in the function plan commences at an initial component in a recursive procedure in the forward direction and returns in the backward direction. A given set of propagation rules for the forward direction and for the backward direction are defined, the components reached in the course of a forward propagation are allocated to a sequence list, the list elements of which include the component codes and during each run through the recursive loop the sequence list obtained on the previous run is updated by means of the current sequence list.

12 Claims, 3 Drawing Sheets

_US 8,635,597 B2_

METHOD FOR DETERMINING THE PROCESSING ORDER OF MODULES IN A FUNCTION PLAN AND ELECTRONIC DATA PROCESSING SYSTEM FOR CARRYING OUT THE METHOD

CROSS REFERENCE TO RELATED APPLICATIONS

This application is the US National Stage of International Application No. PCT/EP2006/063681, filed Jun. 29, 2006 and claims the benefit thereof. The International Application claims the benefits of German application No. 10 2005 031 246.2 DE filed Jul. 1, 2005, both of the applications are incorporated by reference herein in their entirety.

FIELD OF INVENTION

The invention relates to a method for determining the processing order of modules in a function plan for a sequentially operating automation system, each module being assigned a module identifier in a reversibly unambiguous manner, the modules being linked, on the signal side, by means of inputs and outputs, and in the case of a module having a plurality of outputs, these outputs respectively being organized in a predefined manner.

The invention also relates to an electronic data processing system which is suitable for carrying out the method.

BACKGROUND OF INVENTION

The operation of planning control functions of an automation system is often based on graphical function plans in which the required automation functions are placed in the form of graphical function blocks, are parameterized and are connected to one another. Such a function plan can be configured, for example, in accordance with the industry standard IEC 61131-3. The function blocks, which are also referred to as function modules or simply only as modules, generally have one or more inputs and/or outputs. The output signals from other upstream modules in the function plan are usually read in at the inputs. In addition to such "internal" inputs,. there are often also external inputs, at which signals provided by modules in another function plan are read in in a cross-plan manner, and those inputs which are intended to read in a signal (process signal) which has been directly taken or read from the process to be monitored or controlled. Finally, it is also possible to provide modules having firmly parameterized input ports which do not have an input connection. In accordance with the fundamental principle "input—processing—output", the input signals are processed in a module and the resultant results are provided at the outputs. Since the signals which are processed in the modules normally represent logic signals and not physical variables, isolated modules or so-called end modules without outputs may also exist inside a function plan. Other outputs in turn may be external or cross-plan outputs of the function plan.

Each of the automation functions represented by a function module is usually assigned a corresponding software routine which can be stored, for example, in a program library in the form of software code, which can be executed on a target platform, or else can be dynamically generated in an interpreter or the like. The program routines corresponding to the individual modules are generally executed and processed on the target platform of the automation system in a sequential manner in a fixed time clock, in which case, once all of the modules belonging to a sequence group or to a function plan have been processed, processing begins again after a particular waiting time. In this case, it is important, particularly in the case of relatively large function plans with a large number of modules and feedback loops, to select the processing order of the modules in such a manner that cycle delays or dead times in the signal profiles are avoided or at least minimized. As a result, the quickest possible reaction of the automation system to the underlying process should be ensured. A cycle delay is used to denote the situation in which a module which is connected downstream on the signal side is executed before the signal-generating module itself is executed and the signal from the previous cycle is thus present at the module input and is used for the internal calculation. Such a cycle delay or cycle offset, which may result in particular from feedback of signals, ultimately results in a signal which is needed to process a function being available only during the execution of the cycle after next or in the module operating with a signal that is not current and originates from the previous cycle. This results in a reaction of the system which is delayed by the number of cycle delays. Although increasing the clock rate for the entire connection could, in principle, shorten the reaction time again, this usually cannot be sustained for economic reasons.

Since the entire connection of all modules in an automation unit can become very complex, the sequence order should preferably be determined automatically under the secondary condition that the number of cycle delays should be as small as possible for high efficiency of the automation system. Such a method for automatically determining the processing order of modules in a function plan for a sequentially operating automation system is disclosed, for example, in DE 42 30 178 A1. However, the method described there, in which the signal path is essentially traced back in a recursive procedure starting from a system output—that is to say from an external (cross-plan) output in the terminology selected above, the end points of the respective reverse propagation being allocated consecutive processing numbers in ascending order, cannot be used in function plans without signal output and without cross-plan output connections since, in this case, the necessary prerequisites and boundary conditions are absent.

Another disadvantage of the previous solution becomes noticeable particularly if the function plan has been segmented into a plurality of partial plans for easier comprehensibility and clarity or for other reasons. This is because the processing order of the partial plans is not taken into account when determining the respective plan-internal module order in the already known method. In addition, this method has performance problems and does not operate in a strictly deterministic manner since inputs of a module are interrogated in an arbitrary order. Repeatedly carrying out the method with function plans which are connected in an identical manner may thus lead to different results.

SUMMARY OF INVENTION

Therefore, the invention is based on an object of specifying a method of the type mentioned initially which can be applied to a multiplicity of different function plans in as universal and reproducible a manner as possible and in the process minimizes the reaction time of an automation system to process signals. The intention is also to specify an electronic data processing system which is suitable for carrying out the method.

As regards the method, the object is achieved, according to the invention, by virtue of the fact that the signal path in the function plan is respectively traced in a recursive procedure in the forward direction starting from a starting module and is traced back in the reverse direction, a predefined set of propagation rules respectively being used as a basis for propagation in the forward direction and propagation in the reverse direction, the modules which are reached during forward propagation being assigned a sequence list whose list elements comprise the module identifiers, the sequence list available after the previous pass being updated during each pass through the recursion loop using the current sequence list, and the order of the list elements in the sequence list available after the method has been concluded being used as a representation of the processing order of the modules.

In this case, the invention is based on the consideration that the method for determining the processing order should be largely independent of boundary conditions, for example the presence of external (cross-plan) outputs, in order to be able to be applied to a broad class of function plans in as universal a manner as possible. Furthermore, the processing order should be selected in such a manner that input signals which have already been unambiguously determined or have been fixed from the outset are utilized in the system at an early stage. In other words: particularly when feedback loops are present, modules having input states which have already been defined should be processed as early as possible and should thus be provided with a low consecutive processing number so that applied process signals are incorporated into the automation system at an early stage and shorten the reaction time.

A predominantly graphically oriented method which is, in principle, oriented in the forward direction should be used for this purpose. The allocation of consecutive processing numbers or order numbers should thus decisively depend on the forward propagation in the signal direction in the function plan, in which case unambiguous branching rules should be used as a basis at branching points, that is to say modules having a plurality of outputs. In order to implement unambiguous and reproducible propagation rules which generally comprise branching rules and abort conditions for the sequences of steps in the forward and reverse directions, the outputs of the modules should be respectively organized in a predefined manner, the geometrical position of an output or an output connection in the function plan being able to be used as an organization criterion. In order to achieve good performance properties when executing the method steps, the situation in which one component (one module) has to be processed several times should also be avoided. In this respect, it is advantageous to avoid allocating the order numbers in consecutive order but rather to change an order, which has possibly been allocated in temporary or preliminary fashion, once again in the sense of an iterative process during the method and to improve it in the process. Such iterations may preferably be carried out using list operations, the list elements being given by the unambiguous module identifiers, and the order of the list elements representing a preliminary or definitive processing order for the modules in the function plan, depending on the iteration or recursion step just carried out.

With regard to further advantageous refinements of the method, in particular as far as the propagation rules are concerned, reference is made to the subclaims and to the exemplary embodiment. The decisive principles in this case can be summarized as follows: modules in which all input signals have already been unambiguously defined can be handled immediately. The starting point in this case is, in particular, modules which have exclusive parameterized input ports, that is to say do not have any input connections, or modules in which the sources of all input connections are located in plans or plan segments which have already been executed on the basis of the plan order. Such modules can already be assigned an order number in ascending order in advance. The components (the modules) are then pre-sorted for the subsequent recursion procedure, in which case they are organized according to descending priority in accordance with a predefined hierarchy of organization and comparison criteria. Finally, the modules are successively processed in this order, all modules which are connected downstream on the signal side being recursively taken into account via the output connections. Signal tracing is continued until either a module which has already been processed (that is to say has been reached during propagation) is found or until all modules in the function plan have been processed. For better "accounting" of modules which have already been processed and paths which have been covered, it is advantageous to mark each module which has already been reached and/or each output connection which has already been selected.

In the case of more complex function plans which have been subdivided into partial plans for the sake of clarity or for other reasons, the module order is advantageously determined in two phases. In the first phase, the order of the partial plans is determined in accordance with the method described here, the individual partial plans being treated as modules and the cross-plan connections being handled in an analogous manner to module connections. All of the function plans can thus be regarded as a virtual function plan in which each plan is represented in the form of a module. In the second phase, the order of the modules within a partial plan is respectively determined.

The method is advantageously carried out in automated fashion by an electronic data processing system. Provided for this purpose is an electronic data processing system having an input unit, an output unit and a processing unit, the components of which are designed to carry out the method. The method is advantageously stored in a memory unit of the electronic data processing system in the form of an executable software program. It proves to be particularly advantageous if the software program is implemented using the programming language Java since, in this manner, it can be directly executed on a multiplicity of target platforms for which a Java interpreter or a so-called virtual machine is available.

The advantages achieved with the invention are, in particular, that a method for determining the processing order of modules in a function plan is provided, which method is used not only to minimize cycle delays but in which particularly short reaction times to process signals are achieved by prioritizing modules which read in process signals and modules with input signals which have already been defined. Since the method is independent of boundary conditions to the greatest possible extent, it can be applied to any desired function plans in a universal manner. Optimized signal processing is achieved even in the case of complex function plans, which have been subdivided into partial plans, by taking into account the plan order when determining the plan-internal processing order, in particular.

BRIEF DESCRIPTION OF THE DRAWINGS

One exemplary embodiment of the invention is explained in more detail using a drawing, in which.

DETAILED DESCRIPTION OF INVENTION

Identical parts are provided with the same reference symbols in all figures.

Figure 1:
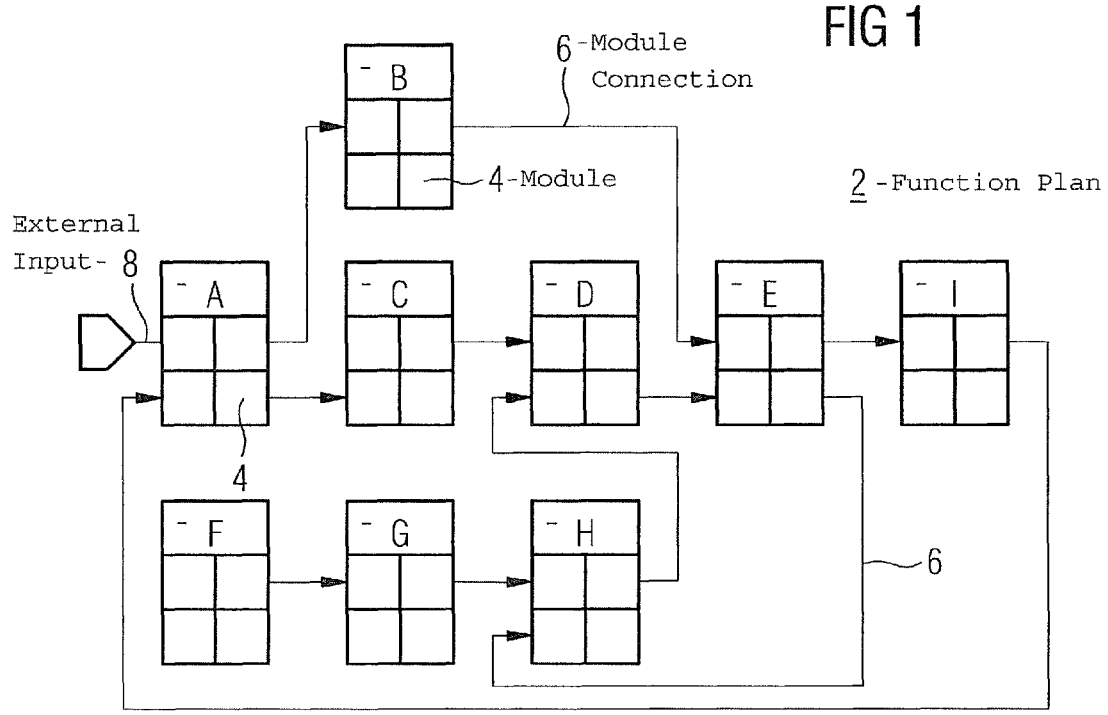
FIGS. 1 to 5 show successive method steps when determining the processing order of modules in a function plan, the order determined being depicted in FIG. 5.

FIG. 1 shows a function plan 2 for planning a control system or an automation system. The function plan 2 is composed, in a modular manner, of individual function modules (modules 4 for short) each representing an automation function. Each module 4 is-assigned an unambiguous module identifier A, B, . . . , I which can be used to identify it. In the present exemplary embodiment, each module 4 has at least one input and one output, the modules 4 being linked to one another on the signal side by virtue of plan-internal module connections 6. The inputs are respectively arranged on the left-hand edge of the boxes representing the modules 4, and the outputs are arranged on the right-hand edge. The connections 6 between the modules 4 are illustrated in FIG. 1 using solid lines. The direction of signal flow - from an output of a module 4 to the input of another module 4 in each case - is illustrated using direction arrows in this case.

The module A is distinguished from the other modules B, . . . , I insofar as it has, in addition to a plan-internal input, a cross-plan (external) input 8 which receives its input signal from another function plan. Inputs which read in process signals and represent an interface to the process to be monitored or controlled by the automation system or to the underlying technical system could generally also be provided. The module F does not have an input connection at all since its input ports which are not identified in any more detail in this case are so-called parameterized input ports in which the respective input signal is predefined independently of the results or output signals from the other modules 4.

The individual steps of the method are explained in detail below using the function plan 2 shown in FIG. 1:

I. Direct Determination of the Order

In the first step, all of the modules 4 which do not have any input connections or in which all of the input signals are already present are determined and marked. This generally also concerns those signals which originate from other function plans (which have already been processed). In the exemplary embodiment according to FIG. 1, it can be seen that the module F is the only module which does not have an input connection. Therefore, it can be directly allocated the order number 1.

Figure 2:
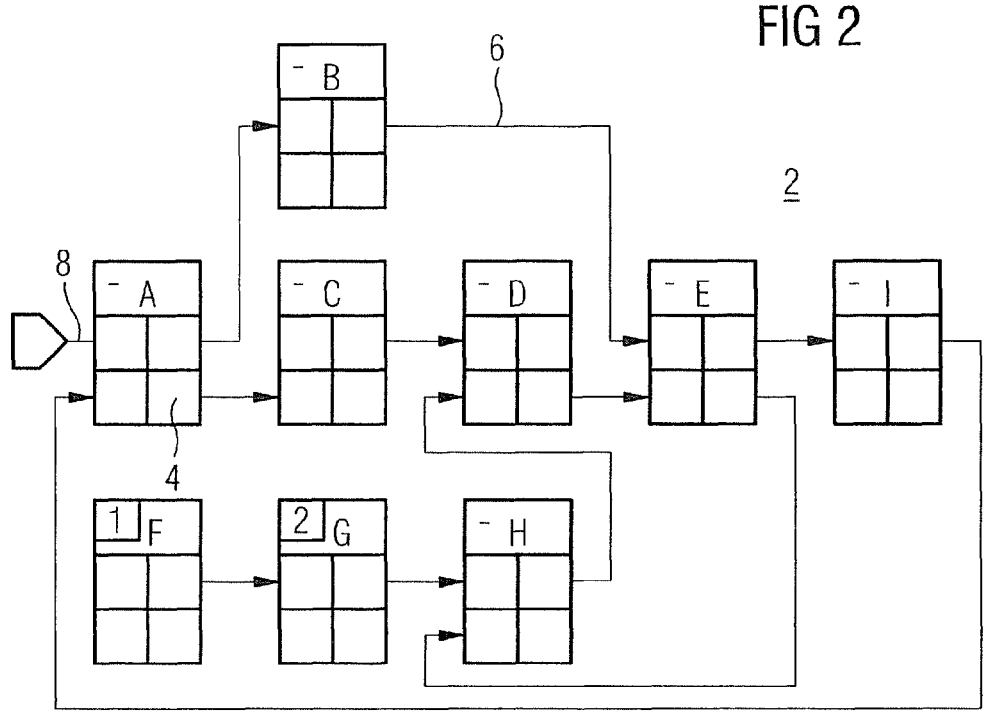

The output signal from the module F is thus also defined, this output signal simultaneously representing the input signal for the module G which is connected downstream of the module F. Therefore, the module G can be inserted into the processing order immediately after the module F. It thus receives the order number 2. The operation is generally continued until no other module can be processed in this manner. For example, that module H which is connected downstream of the module G cannot be directly assigned an order number since it also has, in addition to the (upper) input which has already been defined in terms of the signal, a further (lower) input whose input signal depends on the signal processing of further modules. The result of the direct determination of the order which has been carried out in advance is illustrated in FIG. 2. The order numbers which have already been allocated are respectively depicted in this case in the upper left-hand corner of the boxes representing the modules 4.

II. Sorting

In the next step, all of the modules 4 are weighted with regard to their subsequent processing. The criteria used for this sorting operation have a decisive influence on the result of the overall process of determining the order. Changing the organization and comparison criteria therefore makes it possible to modify the end result in a corresponding manner. An advantageous sorting operation is obtained by using the following comparison criteria, the priority of the conditions mentioned decreasing in the downward direction. That is to say the comparison criterion b) is used only if two modules 4 to be compared are identical as regards the comparison criterion a) etc.

a) Modules 4 having an order number which has already been allocated
b) Modules 4 having a start identifier
c) Number of input signals which have been unambiguously determined
d) Unambiguous module number or position in the function plan.

A start identifier according to criterion b) is generally allocated to those modules 4 which have an input which reads in process signals. The comparison criteria mentioned in point d) have a comparatively low priority and are only used to ensure that the method can be reproduced (determinism). In the exemplary embodiment, the following sorting results under the prerequisite that the cross-plan input signal at the module A is provided by another function plan, which has already been processed, and has thus been unambiguously determined according to criterion c):

F, G, A, H, B, C, D, E, I

III. Tracing the Connection

The individual modules 4 are now processed according to the order obtained by means of the pre-sorting operation, in which case a distinction needs to be made between the following cases:

The module 4 in question already has an order number. In this case, the operation can be immediately continued with the next module 4. In the exemplary embodiment, this applies to the modules F and G.

Otherwise, the module 4 in question is defined as the starting module and the signal path is traced in the forward direction whilst observing the branching rules.

Figure 3:
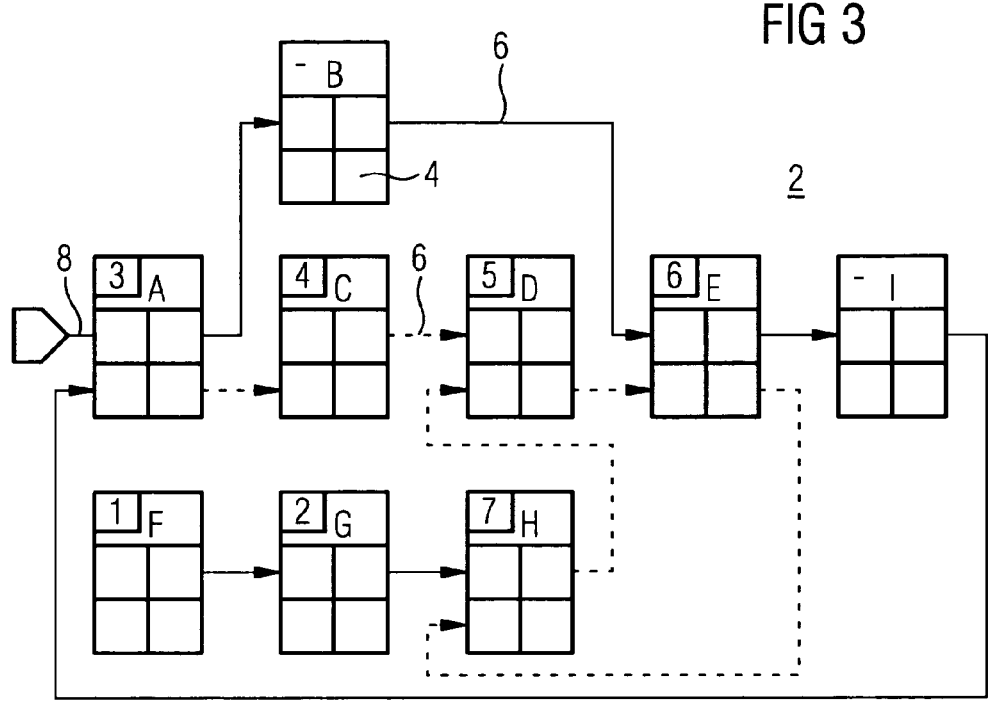

Beginning with module A and using as a basis the rule that a plurality of output connections of a module are processed in turn from the bottom to the top, the image shown in FIG. 3 results. The operation of tracing the signal path is illustrated in said figure using dashed lines. The module A is followed by C, then D, then E, H and D again. Since the module D has already been previously found, forward propagation stops at the module H. The modules found during signal tracing are now assigned the following sequence list. In this case, the modules F and G with a processing number which has already been allocated are placed in front in accordance with convention (but not necessarily):

F-G-A-C-D-E-H (L1)

The modules organized in this sequence list L1 can also be assigned a preliminary order number. In this case, it should be borne in mind, on the one hand, that the numbers 1 and 2 have already been allocated in advance to the modules F and G, with the result that the numbering now continues with 3 in the case of the module A. On the other hand, the preliminary numbering may also change once again in the subsequent recursion steps. It is also possible to dispense with allocating preliminary order numbers and instead to operate with the sequence lists only in the manner described below. In the case of this procedure, the order numbers are thus allocated only using the complete sequence list which has been definitively sorted.

The signal path traced is now traced back in the reverse direction until a module having a further output connection which has not yet been selected or marked is reached. In the exemplary embodiment, this is the module E having a further output connection to module I. The signal tracing operation thus begins again in the forward direction starting from the module E. The signal path traced is again illustrated in FIG. 4 using a dashed line. Since the module A which can be reached from the module I has already been found during the method, forward propagation stops at the module I. The sequence list L1 obtained in this iteration step thus has only a single list element, namely I. The sequence list obtained in the previous pass is updated by inserting the new sequence list (only the module I in this case) into the previous sequence list L1 immediately after the module E, the positions of the subsequent list elements being shifted backward (by one in this case). The updated sequence list therefore looks as follows:

F-G-A-C-D-E-I-H (L2)

Figure 4:
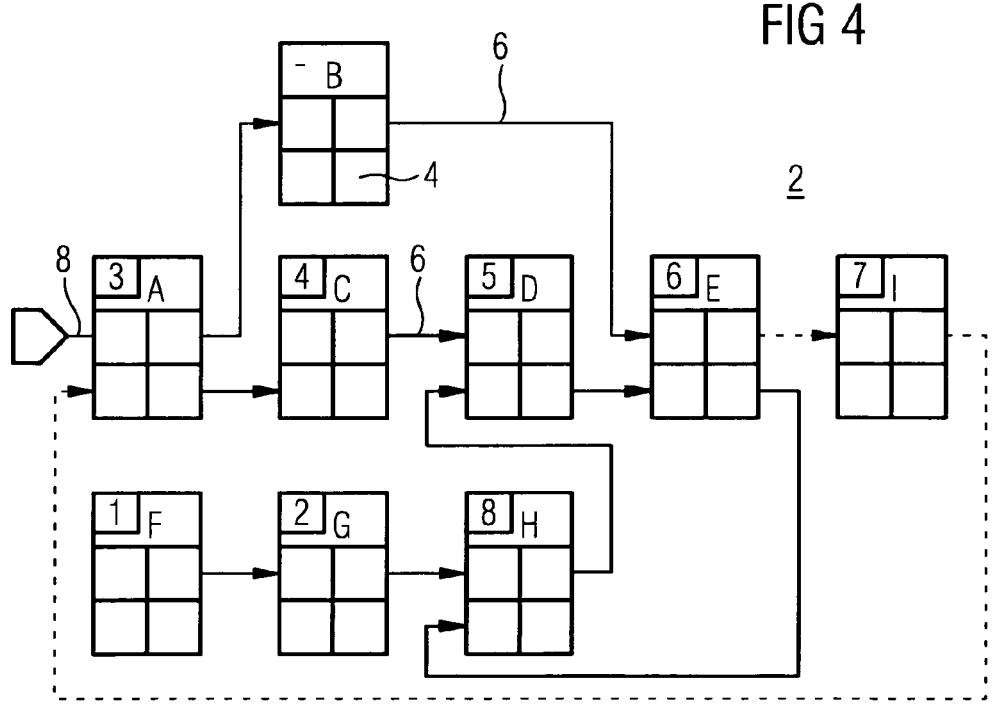

The preliminary order of the modules which has been updated in a corresponding manner is again depicted in FIG. 4.

Figure 5:
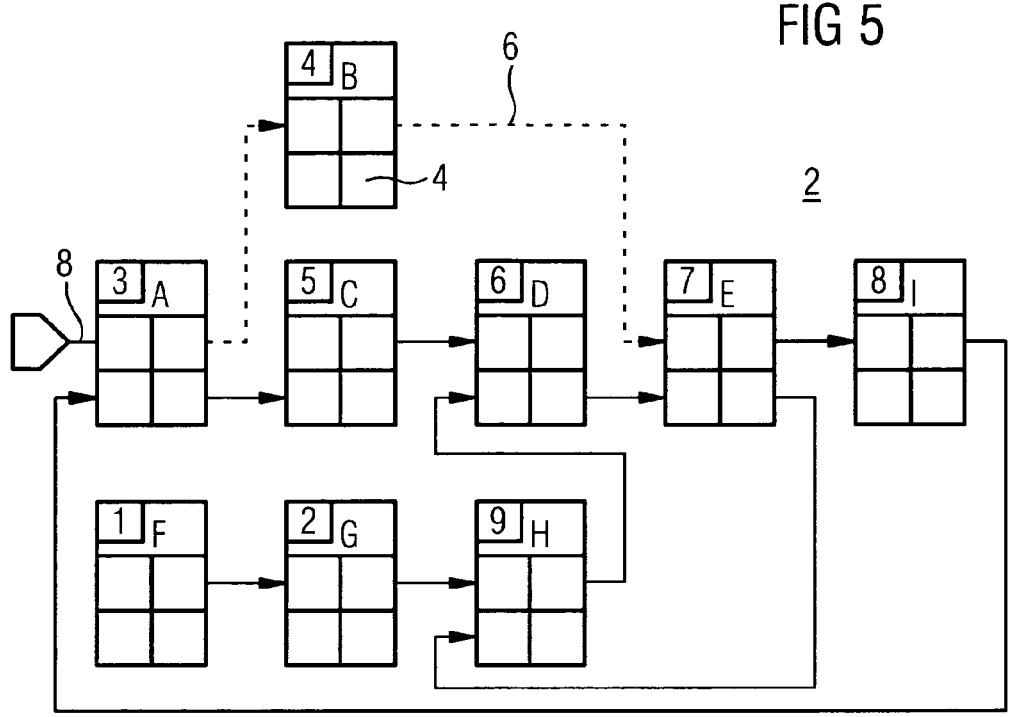

A further propagation phase in the reverse direction follows. This phase finally stops at the module A which also has a second output connection to module B which has hitherto not been traced. The subsequent forward movement ends as early as at module B according to FIG. 5. The module B is inserted into the sequence list L2 obtained last immediately after A, the subsequent elements again being shifted backward. The sequence list which has been updated again thus finally has the following form:

F-G-A-B-C-D-E-I-H (L3)

Since all of the modules in the function plan have been processed, the method stops. The image shown in FIG. 5, in which the definitively allocated order numbers are depicted in all of the modules in the function plan 2, finally results. On account of the feedback loops, two cycle delays occur, namely during the transition from H to D and from I to A.

Figure 6:
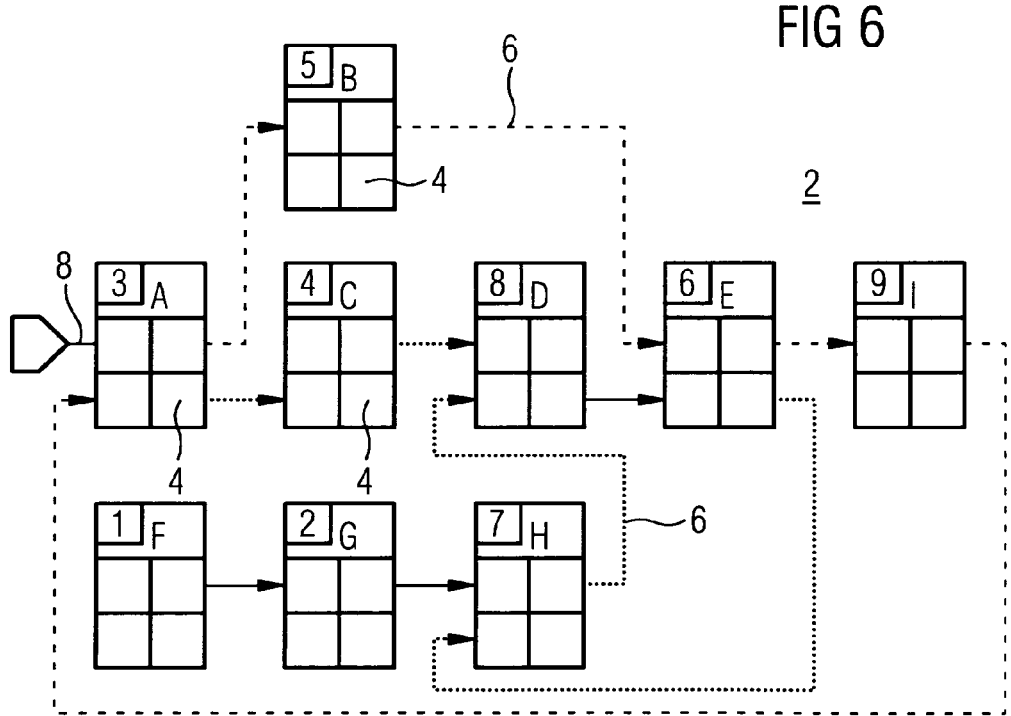
FIG. 6 shows the order determined for the same function plan using alternative branching rules as a basis.

In the event of a plurality of output connections of a module being processed in the opposite direction from top to bottom, the result shown in FIG. 6 would be produced. The resultant order would be modified somewhat in this case but the quality determined by the number of cycle delays and the incorporation of already existing signals would remain unchanged.

If, after all of the outputs of the starting module have been processed in full, further modules which have hitherto not yet been reached were to exist, the recursion procedure according to the original sorting operation (carried out in step II. of the method) would begin from scratch with the next module which has not yet been reached. This would also be the case following premature aborting of the recursion upon reaching a module which has been provided with a start identifier, for example a module which reads in process signals.

IV. Special Cases

Some special treatments may also be required when determining the order of the modules, in particular in the case of relatively complex function plans. For example, in the case of a function plan which has been segmented into partial plans, it is possible to determine whether a partial plan which contains a module that has been provided with a start identifier likewise inherits this feature for determining the plan order. In particular, modules which read in process signals are granted a higher priority by allocating a start identifier. In addition, there are internal dependences for particular modules, which dependences may likewise have an effect on the processing order. In the case of sequence chains, for example, there is a superordinate top module which is connected, on the output side, to further associated sequence blocks in the same function plan. In this case, it must be ensured that the top module is always executed before the sequence blocks since the sequence blocks which are connected downstream are dependent on the signals generated by the top module. For this reason, such a top module likewise receives a start identifier which is not, however, passed on to the associated plan or partial plan since the dependence is only effective inside the plan.

Finally, it may also be necessary or expedient to manually influence the processing order for particular plans in order to advantageously modify the sequence of the modules by resorting to empirically obtained know-how, for example.

The invention claimed is:

1. A method for determining processing order of modules in a function plan for a sequentially operating automation system, comprising:
    providing an automation system with modules having a module identifier assigned to each module, wherein the modules are linked via signal inputs and signal outputs, and wherein a module with a plurality of outputs has the plurality of outputs organized in a predefined manner;
    tracing, in a recursive procedure, a signal path in the function plan in a forward direction starting with a starting module and tracing back the signal path in a reverse direction;
    providing and using a predefined set of propagation rules as a basis for a propagation in the forward direction and a propagation in the reverse direction,
    assigning a sequence list with list elements comprising the module identifiers to modules which are reached during the propagation in the forward direction,
    updating the sequence list during a pass through a recursion loop of the recursive procedure,
    wherein an order of the list elements of the sequence list is used as a representation of the processing order of the modules after the method has been concluded;
    wherein the modules are organized according to priorities before performing the recursive procedure, and wherein an organization hierarchy which comprises the following organization and comparison criteria is used as a basis:
    a) modules having an order number which has already been allocated,
    b) modules having a start identifier, and
    c) number of input signals which have been unambiguously determined;
    wherein each module that has been reached is marked, or wherein each output connection that has already been selected is marked;
    wherein the list elements in the sequence list are organized in an order corresponding to the processing order in which the modules are reached when tracing the signal path in the forward direction; and
    wherein a module having a highest priority among the modules and having an order number which has not yet been allocated, is selected as the starting module for the recursive procedure.

2. The method as claimed in claim 1, wherein, when a module having a plurality of outputs is reached during the propagation in the forward direction, an output which has not been traced during recursion loops is selected according to a predefined order of the plurality of outputs.

3. The method as claimed in claim 2, wherein a propagation path pursued during the propagation in the forward direction is traced back during the propagation in the reverse direction.

4. The method as claimed in claim 3, wherein the propagation in the forward direction is aborted when:
- a module which has already been reached during the method,
- a module having a start identifier or an order number which has already been allocated in advance, or
- an end module without output connections or with only external outputs has been found in a further propagation step in accordance with the predefined set of propagation rules.

5. The method as claimed in one of claim 4, wherein the propagation in the reverse direction is aborted when the module reached in a current propagation step is the starting module or is a module having an output connection which has not yet been traced during the recursion loops.

6. The method as claimed in claim 5, wherein the recursion loops are ended when the starting module has reached all reachable modules.

7. The method as claimed in claim 6, wherein all modules without an input connection and all modules whose input signal has been determined are assigned an order number in ascending order in advance.

8. The method as claimed in claim 7, wherein all modules, which are intended to read process signals, are assigned a start identifier in advance.

9. The method as claimed in claim 8, wherein the recursive procedure is repeated until all modules in the function plan have been reached, wherein the modules are used as modules in an order of decreasing priority.

10. An electronic data processing system, comprising:
an input and output units;
a memory; and
a processor,
wherein the input unit, the output unit and the processing unit are configured as modules in an automation system,
wherein the modules have a module identifier assigned to each module,
wherein the modules are linked via signal inputs and signal outputs,
wherein a module with a plurality of outputs has the plurality of outputs organized in a predefined manner, and
wherein the modules are configured to:
trace, in a recursive procedure, a signal path in the function plan in a forward direction starting with a starting module and trace back the signal path in a reverse direction,
use a predefined set of propagation rules as a basis for a propagation in the forward direction and a propagation in the reverse direction,
assign a sequence list with list elements comprising the module identifiers to modules which are reached during the propagation in the forward direction,
update the sequence list during a pass through a recursion loop of the recursive procedure,
wherein an order of the list elements of the sequence list is used as a representation of a processing order of the modules after the method has been concluded,
wherein the modules are organized according to priorities before performing the recursive procedure, and wherein an organization hierarchy which comprises the following organization and comparison criteria is used as a basis:
a) modules having an order number which has already been allocated,
b) modules having a start identifier, and
c) number of input signals which have been unambiguously determined;
wherein each module that has been reached is marked, or wherein each output connection that has already been selected is marked;
wherein the list elements in the sequence list are organized in an order corresponding to the processing order in which the modules are reached when tracing the signal path in the forward direction; and
wherein a module having a highest priority among the modules and having an order number which has not yet been allocated, is selected as the starting module for the recursive procedure.

11. The electronic data processing system as claimed in claim 10, wherein the method is stored in a memory unit as an executable software program.

12. The electronic data processing system as claimed in claim 11, wherein the software program is implemented using the programming language Java.

* * * * *